3,507,393
SEWAGE TREATMENT SYSTEM

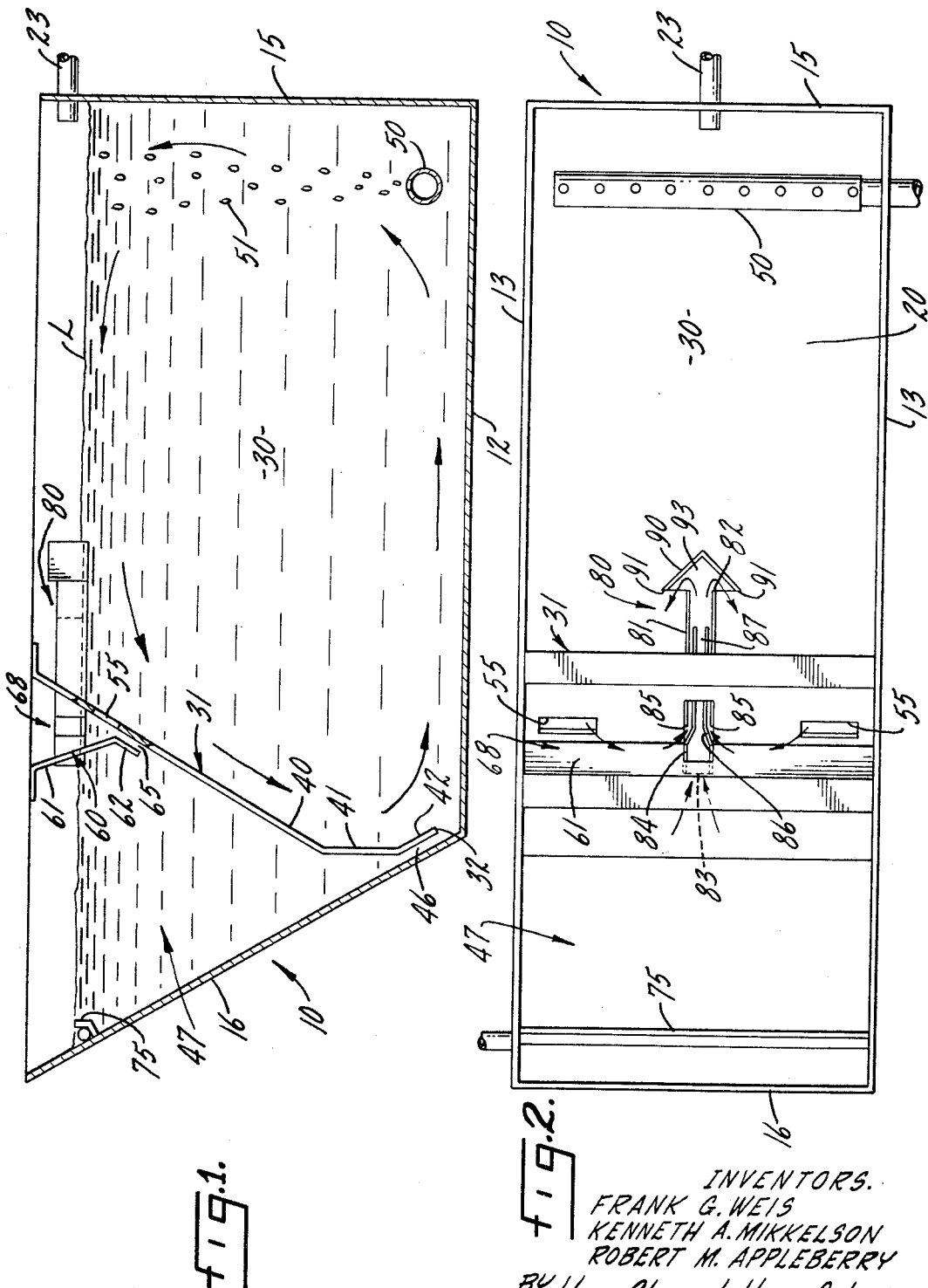

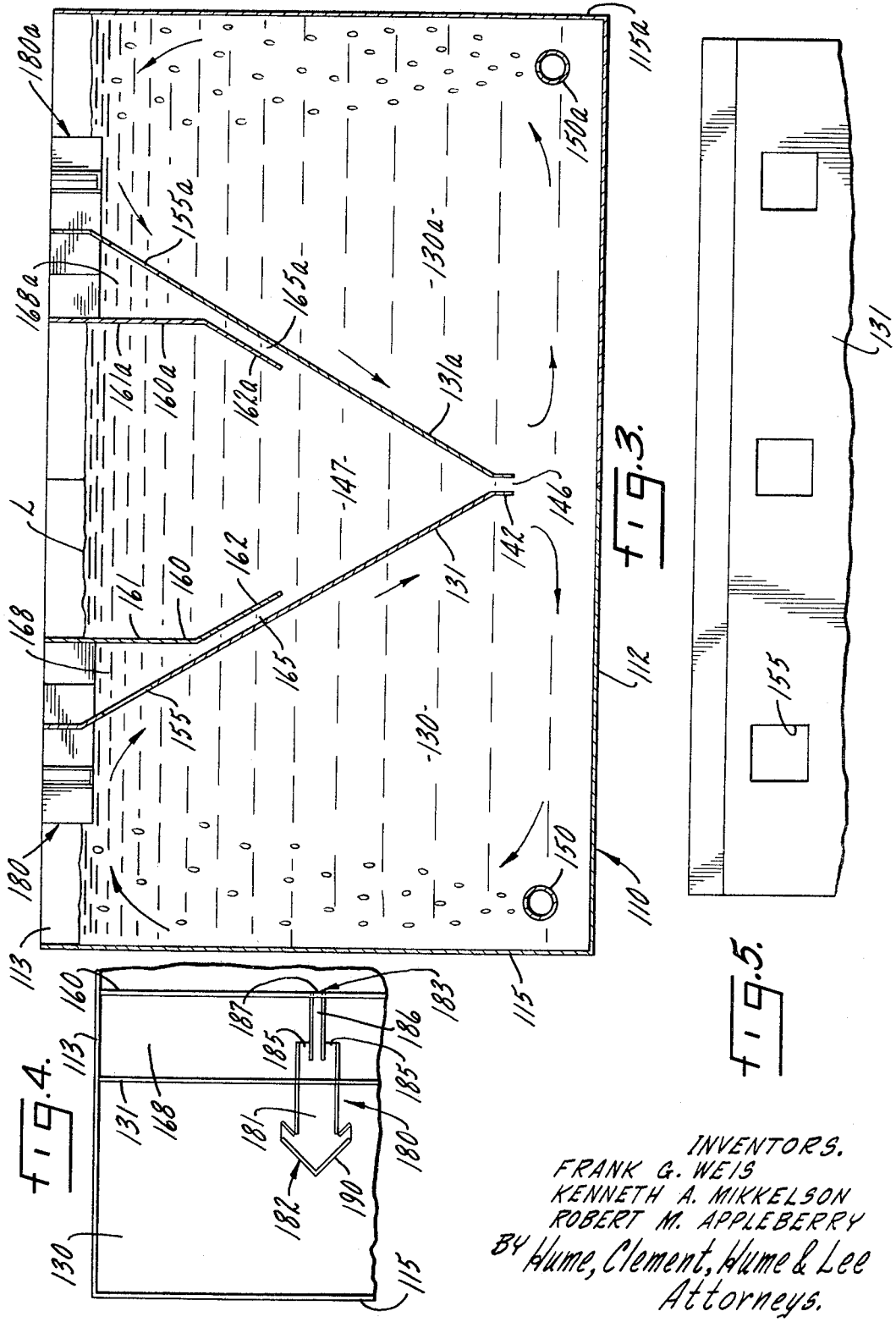

Frank G. Weis, Kansas City, Mo., Kenneth A. Mikkelson, Overland Park, Kans., and Robert M. Appleberry, Independence, Mo., assignors, by mesne assignments, to Union Tank Car Company, Chicago, Ill., a corporation of New Jersey
Continuation of application Ser. No. 717,143, Mar. 29, 1968. This application June 18, 1969, Ser. No. 838,019
Int. Cl. C02c 1/12
U.S. Cl. 210—195                                           11 Claims

ABSTRACT OF THE DISCLOSURE

A sewage treatment system including a clarifier section of relatively small area defined by baffle arrangements whose configurations cause even sewage flow across the width of the chamber. The baffle arrangement incorporates throttling inlet slots which precisely control hydraulic flow from the aeration section to the clarifier section. The inlet slots are below liquid level, but in the upper region of the aeration section. Laminar downward flow against primary baffle means in the clarifier section is effected. Heavier solids return to the aeration section at the bottom of the section, drawn in part by the flow pattern of sewage in the aeration section acting on a return mouth. A common eductor arrangement returns solid floatables from both the energy absorption chamber and the main portion of the clarifier section to the aeration section.

---

This application is a continuation of our prior copending application Ser. No. 717,143, filed Mar. 29, 1968, and now abandoned.

BACKGROUND OF THE INVENTION

This invention relates in general to the treatment of sewage. It deals more particularly with the aeration treatment of solid containing liquid sewage.

Sewage treatment systems of the type illustrated in the Baxter et al. Patent No. 2,574,685 are well known in the art. Such systems conventionally comprise a treatment tank containing an aeration section and a clarifier section. Aeration of the solid bearing liquid sewage takes place continuously in the aeration section, creating sludge. A continuous flow of the sludge bearing liquid into the clarifier section is effected and the sludge is permitted to settle. The sludge is returned to and mixed with the contents of the aeration section while supernatant liquid is withdrawn from the surface of the clarifier section.

Broadly similar sewage treatment systems which constituted marked improvements over the Baxter et al. system have been developed. Systems embodying improvements in this type of sewage treatment are illustrated in the Weis et al. Patent No. 3,161,590 and the Kibbee Patent No. 3,195,727, for example. As will be noted, these latter two inventions are assigned to the assignee of the present application.

SUMMARY OF THE INVENTION

The swage treatment system embodying the present invention is an improvement over all these presently known systems. It is, to this end, a primary object of the invention to provide a sewage treatment system which effects more efficient activated sludge treatment of the sewage. It is another object to provide a system which effects closely controlled hydraulic movement of sewage from the aeration section to the clarifier section of the tank and, in addition, return of the sludge to the aeration section. Another object of the invention is to provide an improved, relatively more simple, and less expensive treatment system, including an improved eductor system for skimming the surface of the clarifier section to return floatable solids from the clarifier section to the aeration section.

In summary, the sewage treatment system of the present invention incorporoates a new concept in clarifier section, coupled with a substantially conventional aeration section. More specifically, the area of the clarifier section utilized as an energy absorption chamber is defined by a baffling arrangement whose configuration causes even flow distribution across the width of the chamber. The baffling arrangement incorporates throttling inlet slots which precisely control hydraulic flow from the aeration section to the clarifier section. This flow is below the liquid level so that little foam and light solids actually enter the chamber. The baffling arrangement induces laminar flow of the heavier solids containing liquid along a main baffle to a point where it is drawn back into the aeration section by a draft flow created at a return mouth by the flow pattern in the aeration section. The flow of effluent liquid to the outlet weir is precisely controlled also by the baffling arrangement. In one variation of the invention, the clarifier section is positioned intermediate opposite ends of the aeration section with energy absorption chambers facing each half aeration section. In this variation, the flow patterns in the clarifier section and opposite ends of the aeration section cooperate to induce the flow of liquid entrained solids through a common mouth out of the clarifier section.

BRIEF DESCRIPTION OF THE DRAWINGS

The invention, including its construction and method of operation, along with other objects and advantages thereof, is illustrated more or less diagrammatically in the drawings, in which:

FIGURE 1 is a vertical sectional view taken lengthwise through the treatment tank embodying features of the present invention;

FIGURE 2 is a plan view of the tank illustrated in FIGURE 1;

FIGURE 3 is a vertical sectional view taken lengthwise through a treatment tank embodying a variation of the present invention;

FIGURE 4 is a plan view of the treatment tank illustrated in FIGURE 3, with parts broken away; and FIGURE 5 is an end view of a primary baffle plate in the tank illustrated in FIGURES 3 and 4.

DESCRIPTION OF THE PREFERRED EMBODIMENT

Referring now to the drawings, and to FIGURES 1 and 2, a sewage treatment tank embodying features of the present invention is illustrated generally at 10. The tank 10 is fabricated in a conventional manner from sheet steel or the like and includes a bottom wall 12, identical side walls 13, and opposed inlet end wall 15 and outlet end wall 16.

The tank 10 has a generally open top 20 in the illustration. However, it is contemplated that covering means (not shown) might be provided in actual operational use of the system. The side walls 13 and inlet end wall 15 are vertically disposed, as will be recognized, while the outlet end wall 16 is inclined outwardly of the tank 10.

The tank 10 receives raw solid-bearing liquid sewage through a conventional inlet pipe 23. The incoming sewage is directed into the tank 10 at the inlet end wall 15 thereof. This sewage enters the aeration section 30 of the tank 10, which is defined by the bottom wall 12, the side wall 13, the inlet end wall 15 of the tank and an inwardly inclined partition baffle 31. The baffle 31 is disposed between the side walls 13 of the tank 10 and extends from the open top 20 of the tank to a lower edge 32 disposed a short distance above the bottom wall 12 of the tank 10.

The partition baffle 31 includes an upper portion 40 which is inclined toward the inlet end wall 15 of the tank 10, an intermediate portion 41 which is disposed substantially vertically, and a lower portion 42 which extends generally parallel to the outlet end wall 16, displaced a short distance therefrom, so as to define an outlet mouth 46 from the clarifier section 47 of the tank 10 to the aeration section 30. As will be recognized, the baffle 31 and outlet end wall 16 co-operate to define a generally wedge-shaped clarifier section 47.

As the incoming sewage enters the aeration section 30 of the tank 10, it encounters a rising stream of liquid entrained solids and air, the latter having been emitted from an air header assembly 50 extending transversely across the aeration chamber 30 adjacent the bottom wall 12 and inlet wall 15 thereof. The air header assembly 50 receives air in any suitable manner from an outside source and emits it adjacent the inlet end wall 15. The risoing column of air bubbles, illsutrated generally at 51, induces counter-clockwise rotation of the solid bearing liquid sewage in the aeration chamber section 30, as illustrated by arrows in FIGURE 1.

As the sewage flows in a counter-clockwise direction in the aeration chamber 30, and, in this process, is subjected to aeration treatment to form sludge in a well-known manner, it encounters that partition baffle 31. The configuration and angular disposition of the baffle 31 is such that it continues to direct the flow of sewage in a counter-clockwise direction in the aeration chamber 20. At the same time, however, transversely spaced, rectangular inlet ports 55 in the upper portion 40 of the baffle 31 permit a portion of this rotating sewage to pass through the baffle 31 into the clarifier section 47. The inlet ports 55 are sized so that flow through them is throttled, however. According to the invention, flow is throttled down to that which will tend to adhere in laminar fashion when redirected down the baffle 31 in the clarifier section 47, and not develop turbulent boundary layer flow. They are positioned below the sewage level L to prevent quantities of foam and light solids from entering the clarifier section 47.

The velocity of this liquid flow entering the clarifier section 47 is dampened by a secondary baffle 60 disposed in the clarifier section and extending between the opposite side walls 13 of the tank 10. The secondary baffle 60 is inclined at substantially the same angle as the end wall 16, away from the partition baffle 31, in its upper portion 61, while a lower portion 62 thereof is disposed substantially parallel to the upper portion of the baffle 31. The lower portion 62 of the secondary baffle 60 defines, with the upper portion 40 of the partition baffle 31, an inlet mouth 65. The secondary baffle 60 thus forms, with the partition baffle 31, an inlet chamber 68 to the clarifier section 47.

The velocity of the incoming flow of liquid and entrained solids is, in addition to being dampened by the secondary baffle 60, redirected by it. Because the baffle portion 61 is inclined away from sewage flow, it directs flow upwardly, initially, causing even flow distribution across the width of the chamber 68. Flow velocity is further reduced and entrapped air readily escapes. The liquid is then directed downwardly by the baffle through the inlet mouth 65 along the baffle 31 in its upper portion 40. This dampened flow of liquid with its entrained solids proceeds slowly down the baffle 31 in laminar flow due primarily to the initial guidance by the secondary baffle 60, the force of gravity and a hydraulic "draw" created at the mouth 46 by the mixing pattern of counterclockwise flow of sewage in the aeration chamber, as it flows past the lower portion 42 of the baffle 31.

The heavier solids which enter the clarification section 41 follow this path and return to the aeration section 30 through the mouth 46. At the same time, supernatant liquid is gradually peeled off upwardly by the flow velocity differential with quiescent liquid in the clarifier section proper. This water rotates gently upwardly and passes over the effluent weir 75 in the clarifier section 47 to depart the tank 10 as the final effluent of the treatment operation. By having inlet ports 55 on each side of the clarifier section, laminar flow of sludge bearing liquid down both sides of the baffle 31 forestalls secondary transverse circulation with its concomitant turbulence. All of these factors contribute to maximum settling efficiency in the clarifier section 47.

All solids do not depart the clarifier section in the foregoing manner. Some light, floatable solids rise to the surface of the inlet chamber 68 and the clarifier section 47, proper. These floatable solids are returned to the aeration section 30 by a common eductor assembly 80.

The common eductor assembly 80 comprises a channel-shaped trough 81 which extends through the partition baffle 31, substantially at the level L of the liquid in the tank 10, at a point disposed mid-way between the inlet ports 55 in the baffle 31. The outer end 82 of the trough 81 is disposed in the aeration section 30 while its inner end 83 extends into the clarifier section 47.

The inlet end 83 of the eductor trough 81 extends through a suitably formed aperture in the secondary baffle 60. The side walls 84 of the trough are slotted at 85 in the chamber 68. Inner side walls 86 converge adjacent the slots 85 within the trough 81 and then extend parallel again to form an inner flow trough 87.

Disposed opposite the open mouth 82 of the trough 81, directly in the path of counter-rotating sewage in the aeration section 30, is an eductor plate 90. The eductor plate 90 is wedge-shaped in plan configuration (see FIGURE 2) so that its transversely disposed opposite ends 91 bracket the end 82 of the trough 81. The eductor plate 90 is secured to the trough 81 by a base plate 93 which is a continuation of the trough 81 base.

The flow of sewage past the wedge-shaped eductor plate 90 in its counterclockwise rotation in the aeration section 30 entrains liquid in the trough 81, creating a draw of liquid and light, floating solids from the inlet chamber 68 into the open slots 85, and through the trough 81 into the aeration section 30. This flow is further induced by the natural effect of liquid pouring through the inlet ports 55 into the inlet chamber 68, urging these light surface solids toward the center of the inlet chamber.

At the same time, light floating solids in the clarifier section 47, proper, are drawn into the trough 87 through flow induced therein. These light, floatable solids flow through the trough 87 and out the open end 82 into the aeration section 30.

It should now be recognized that a treatment tank 10 which has few components and, as such, is simple and inexpensive in construction, has been illustrated and described. Nevertheless, highly effective sewage treatment is accomplished. The flow of sewage being treated in the aeration section 30 of the tank 10 induces a downward flow of liquid entrained sludge in the clarifier section 47 of the tank. This downward flow of the sludge, and its ultimate return to the aeration section 30, is effected at a steady, relatively low velocity, with minimal surging and, consequently, maximum efficiency. It is the arrangement of the inlet ports 55 and the secondary baffle 60 in the clarifier section 47 which effect this desirable flow pattern. In this light, the flow attaches to the partition baffle 31 by Coanda effect which eliminates the necessity of having a "long" or deep secondary baffle.

As a result, the system assures high volume flow of liquid through the clarifier section 47. Settling of solids in the section 47 takes place rapidly. Accordingly, minimum solid retention time in the clarifier section 47 is achieved; an important factor in biological systems of this type.

Aiding this high volume flow is the lack of turbulence where flow passing through the outlet mouth 46 enters the aeration chamber 30. Turbulence is avoided because liquid flow is, in both instances, traveling in the same direction and flow reversal from circulating currents is avoided.

A variation of the invention is illustrated in FIGURES 3–5, where a modified form of sewage treatment tank is illustrated generally at 110. The tank 110 is similar to the tank 10 in that it comprises a bottom wall 112 and identical side walls 113. It is distinguished from the tank 10 in that it has oppositely disposed vertical end walls 115 and 115a.

The tank 110 is further distinguished in that aeration half-sections 130 and 130a are defined adjacent opposite end walls 115 and 115a of the tank 110 by the end walls and corresponding opposed, partition baffles 131 and 131a. The partition baffles 131 and 131a converge downwardly to vertical lower portions 142 which are parallel and define between them an outlet mouth 146 from a common clarifier section 147 betwen the baffles.

Incoming sewage enters each aeration half-section 130 and 130a adjacent a corresponding end wall 115, and 115a, where it encounters a rising stream of liquid entrained solids and air, the latter having been emitted from air header assemblies 150 and 150a extending transversely across each aeration section adjacent a corresponding end wall. The sewage flows in a clockwise direction in the aeration half-section 130 and in a counterclockwise direction in the aeration half-section 130a.

The sewage flowing in this manner encounters corresponding partition baffles 131 and 131a, whereupon a portion of each rotating flow passes into the clarifier section 147 through corresponding sets of inlet ports 155 and 155a, formed in the partition baffles 131 and 131a, respectively. The inlet ports 155 and 155a are identical in configuration and size to the ports 55 hereinbefore discussed in relation to the treatment tank 10. As will be noted, however, there are three of such ports in each partition baffle 131 and 131a, the ports being evenly spaced across the baffle in question. Similar to the tank 10, the ports 155 and 155a are positioned slightly below the sewage level L.

The velocity of this liquid flow entering the clarifier section 147 is dampened by identical secondary baffles 160 and 160a, disposed in the clarifier section 147 and extending between opposite side walls 113. Upper portions 161 and 161a of the baffles 160 and 160a, respectively, extend substantially vertically, while lower portions 162 and 162a, thereof, are disposed substantially parallel to the converging portions of baffles 131 and 131a. These lower portions 162 and 162a define, with the partition baffles 131 and 131a, identical inlet mouths 165 and 165a from inlet chambers 168 and 168a to the clarifier section 147, proper.

The incoming flow of liquid and entrained solids is directed downwardly by the secondary baffles 160 and 160a. In a manner similar to that effected in the tank 10 operation, hereinbefore discussed, this flow is directed through a corresponding inlet mouth 165 and 165a and downwardly, in laminar flow, on a corresponding partition baffle 131, 131a toward the outlet mouth 146.

The liquid entrained heavier solids flow through the mouth 146 from the clarifier section 147 into the aeration half-sections 130 and 130a at their juncture. This flow is induced by its own weight, the cooperative effects of downward laminar flow driving toward the mouth 146, and the "draw" created at the mouth 146 by the mixing pattern of clockwise and counter-clockwise flow of sewage in the aeration sections 130 and 130a as it flows past the lower portions 142 and 142a of the baffles 131 and 131a. It has been found that these cooperating forces synergistically induce a flow rate which is greater than contemplated in this compound system of tank 110.

All solids do not depart the clarifier section 147 in the foregoing manner, as will once again be recognized. Some light, floatable solids rise to the surface of the inlet chambers 168 and 168a, and the clarifier sections 147, proper. These floatable solids are returned to the aeration sections 130 and 130a by two pairs 180 and 180a of eductor assemblies.

Each eductor assembly 180 and 180a is identical in construction and operation, so only one will be described in detail. Corresponding reference numerals (with the suffix a where appropriate) are applied to corresponding components of each eductor assembly. Two of such eductor assemblies 180 extend through the primary baffle-secondary baffle 131, 160 assemblies at points intermediate corresponding inlet ports 155. Each eductor assembly 180 functions in substantially identical fashion to the common eductor assembly 80 described in relation to the tank 10.

Each common eductor assembly 180 comprises a channel-shaped trough 181 which extends through the corresponding partition baffle 131, substantially at the level L of the liquid in the tank 110. The outer end 182 of the trough 181 is disposed in the aeration section 130 while its inner end 183 extends into the clarifier section 147.

Each trough 181 opens into the absorption chamber 168 at trough side mouths 185. A reduced width extension 186 of the trough 181 extends through a suitably formed aperture in the secondary baffle 160 where it opens at a mouth 187 into the clarifier section 147, proper.

The outer end 182 of each trough 181, directly in the path of rotating sewage in the aeration half-section 130, has a wedge-shaped eductor plate 190 disposed over it. The flow of sewage past the wedge-shaped eductor plate 190 entrains liquid in the trough 181 and the trough extension 186, creating a draw of the liquid and light floating solids from the chamber 168 and the clarifier section 147, proper.

The modified tank 110 embodies all of the features of the invention embodied in the tank 10. It provides however, in addition, a compound and, apparently, synergistic effect of forces working together to achieve totally unexpected and improved results. The tank 110 thus operates more efficiently than the tank 10, although it is slightly more expensive in construction.

What is desired to be claimed and secured by Letters Patent of the United States is:

1. A fluid treatment system comprising:
   (a) a treatment tank,
   (b) said treatment tank including aeration section means and clarifier sections means,
   (c) means for introducing solid bearing liquid sewage to said aeration section means,
   (d) means for withdrawing liquid from said clarifier section means including level controller means,
   (e) partition means separating said aeration section means from said clarifier section means, said partition means extending above the level of said level controlling means,
   (f) means in said aeration section means for aerating solid bearing liquid sewage therein and causing it to move in a rotational flow path whereby it flows toward said partition means in the upper region of said tank, down one side of said partition means and away from said partition means in the lower region of said tank,
   (g) inlet port means in said partition means adjacent the upper region of said tank with the uppermost extremity of said inlet port means being below the level of said level controlling means whereby a portion of the rotating sewage encountering said partition means flows therethrough into said clarifier section means,
   (h) means in said clarifier section means for directing said sewage flow downwardly therein,
   (i) and outlet means from said clarifier means to said aeration section means in the lower region of said tank,
   (j) whereby descending solids in said clarifier section means pass through said outlet means and back into said aeration section means.

2. The sewage treatment system of claim 1 further characterized in that:

(a) said directing means in said clarifier section means comprises secondary baffle means,
(b) said secondary baffle means forming energy absorption chamber means with said partition means in said clarifier section means,
(c) and communication means from said energy absorption chamber means into the remainder of said clarifier section means,
(d) said communication means being formed by a lower portion of said secondary baffle means which directs incoming sewage from said aeration section means downwardly in laminar flow along said partition means and toward said outlet means.

3. The sewage treatment system of claim 2 further characterized in that:
(a) said outlet means is defined between an inclined end wall of said tank and a lower portion of said partition means,
(b) said lower portion of said partition means extending generally parallel to the adjacent inclined end wall,
(c) said rotational flow of sewage in said aeration section means flowing past said lower portion of said partition means and creating a draw of liquid entrained solids through said outlet means into said aeration section means.

4. The sewage treatment system of claim 1 further characterized in that:
(a) said inlet port means comprises a plurality of inlet ports transversely spaced in said partition means.

5. The sewage treatment system of claim 2 further characterized in that:
(a) common eductor means extending from said aeration section means into communication with both said energy absorption chamber means and the remainder of said clarifier section means.

6. The sewage treatment system of claim 6 further characterized in that:
(a) said eductor means includes trough means having an inlet in said energy absorption chamber means and an outlet in said aeration section means, and
(b) flow guide means extending from said inlet through said directing means into said remainder of said clarifier section means.

7. The sewage treatment system of claim 2 further characterized in that:

(a) said secondary baffle means is inclined away from said partition means so as to form a generally wedge-shaped energy absorption chamber.

8. The sewage treatment system of claim 1 further characterized in that:
(a) said aeration section means comprises a first aeration chamber half-section and a second aeration chamber half-section bracketing said clarifier section means.

9. The sewage treatment system of claim 8 further characterized in that:
(a) said partition means comprises a first partition baffle disposed between said clarifier section means and said first aeration chamber half-section and a second partition baffle disposed between said clarifier section means and said second aeration chamber half-section.

10. The sewage treatment system of claim 9 further characterized in that:
(a) said inlet port means comprises a plurality of inlet ports transversely spaced in each of said partition baffles.

11. The sewage treatment system of claim 9 further characterized in that:
(a) said partition baffles converge to form a wedge-shaped clarifier section means and define an outlet mouth from said clarifier section to each aeration chamber half-section adjacent the bottom of said tank.

References Cited
UNITED STATES PATENTS

| | | | |
|---|---|---|---|
| 2,574,685 | 11/1951 | Baxter et al. | 210—195 |
| 2,989,186 | 6/1961 | Weis | 210—221 X |
| 3,161,590 | 12/1964 | Weis et al. | 210—221 |
| 3,195,727 | 7/1965 | Kibbee | 210—221 X |
| 3,348,687 | 10/1967 | Foster | 210—221 X |
| 3,355,023 | 11/1967 | Foster | 210—195 |

JAMES L. DE CESARE, Primary Examiner

U.S. Cl. X.R.

210—221